US012691624B2

(12) United States Patent (10) Patent No.: US 12,691,624 B2
Burkhart et al. (45) Date of Patent: *Jul. 28, 2026

(54) METHOD FOR THE DEVULCANISATION OF A VULCANISAED RUBBER MIXTURE, DEVICE FOR CARRYING OUT THE METHOD, AS WELL AS A RUBBER MIXTURE AND VEHICLE PNEUMATIC TYRE, COMPRISING A COMPONENT MADE OF THE RUBBER MIXTURE

(71) Applicant: Continental Reifen Deutschland GmbH, Hannover (DE)

(72) Inventors: Alexander Burkhart, Essen (DE); Hilke Wolf, Isernhagen (DE); Konstantin Efimov, Shanghai (CN); Thomas Völker, Seelze (DE)

(73) Assignee: Continental Reifen Deutschland GmbH, Hannover (DE)

( * ) Notice: Subject to any disclaimer, the term of this patent is extended or adjusted under 35 U.S.C. 154(b) by 784 days.

This patent is subject to a terminal disclaimer.

(21) Appl. No.: 18/001,090

(22) PCT Filed: May 31, 2021

(86) PCT No.: PCT/DE2021/200073

§ 371 (c)(1),
(2) Date: Dec. 8, 2022

(87) PCT Pub. No.: WO2021/249593

PCT Pub. Date: Dec. 16, 2021

(65) Prior Publication Data

US 2023/0212369 A1 Jul. 6, 2023

(30) Foreign Application Priority Data

Jun. 8, 2020 (DE) ..................... 10 2020 207 121.7

(51) Int. Cl.
| | |
|---|---|
| *B29C 48/40* | (2019.01) |
| *B29B 17/04* | (2006.01) |
| *B29C 48/07* | (2019.01) |
| *B60C 1/00* | (2006.01) |
| *C08C 19/08* | (2006.01) |
| *C08J 11/12* | (2006.01) |
| *C08J 11/28* | (2006.01) |
| *C08K 5/01* | (2006.01) |
| *C08K 5/18* | (2006.01) |
| *B29L 30/00* | (2006.01) |

(52) U.S. Cl.
CPC .......... *B29C 48/07* (2019.02); *B29B 17/0412* (2013.01); *B29C 48/40* (2019.02); *B60C 1/00* (2013.01); *C08C 19/08* (2013.01); *C08J 11/12* (2013.01); *C08J 11/28* (2013.01); *C08K 5/01* (2013.01); *C08K 5/18* (2013.01); *B29B 2017/0424* (2013.01); *B29L 2030/00* (2013.01); *C08J 2317/00* (2013.01)

(58) Field of Classification Search
CPC .. C08J 11/10; C08J 11/12–28; C08J 2307/00; C08J 2309/00; C08J 2309/02; C08J 2309/06; C08J 2311/00; C08J 2313/00; C08J 2315/00–02; C08J 2317/00; C08J 2319/00; C08J 2321/00
See application file for complete search history.

(56) References Cited

U.S. PATENT DOCUMENTS

| | | | |
|---|---|---|---|
| 6,590,042 B1 | 7/2003 | Tang | |
| 7,189,762 B2 | 3/2007 | Tzoganakis | |
| 12,391,821 B2 * | 8/2025 | Soetbeer | B29B 17/02 |
| 2009/0221751 A1 | 9/2009 | Hasse et al. | |
| 2013/0137786 A1 | 5/2013 | Maris | |
| 2015/0148435 A1 | 5/2015 | Arnaud | |
| 2015/0166759 A1 * | 6/2015 | Recker | C08J 11/10 |
| | | | 521/41.5 |
| 2019/0382552 A1 | 12/2019 | Zhang et al. | |
| 2023/0028139 A1 | 1/2023 | Soetbeer et al. | |

FOREIGN PATENT DOCUMENTS

| | | | | |
|---|---|---|---|---|
| CN | 102250381 | | 11/2011 | |
| CN | 105729755 A | | 7/2016 | |
| DE | 102006004062 A1 | | 8/2007 | |
| DE | 102017201503 A1 | | 8/2018 | |
| EP | 1201390 A1 | | 5/2002 | |
| EP | 1493596 B1 | | 12/2012 | |
| EP | 2601249 B1 | | 11/2016 | |
| EP | 3178628 A1 | | 6/2017 | |
| WO | WO-9839148 A1 * | | 9/1998 | C08J 11/10 |
| WO | 2012017414 A1 | | 2/2012 | |
| WO | 2014032818 A1 | | 3/2014 | |
| WO | 2021115678 A1 | | 6/2021 | |

OTHER PUBLICATIONS

Machine Translation of WO98/39148 A1. Sep. 11, 1998. (Year: 1998).*

(Continued)

*Primary Examiner* — Stephen E Rieth
(74) *Attorney, Agent, or Firm* — Richard A. Wolf; Gregory Adams

(57) ABSTRACT

The invention relates to a process for devulcanizing a vulcanized rubber mixture, comprising the following steps: A) providing or producing a vulcanized rubber mixture, B) comminuting the vulcanized rubber mixture into a granulate of vulcanized rubber particles, C) extruding the vulcanized rubber particles produced in step B) in a twin-screw extruder to form a devulcanized rubber mixture,
    wherein, during the extruding in step C) at least one regeneration reagent is added to the extruded rubber particles, wherein the regeneration reagent comprises at least one silane, at least one plasticizer, at least one aging stabilizer or mixtures thereof. The invention also comprises an apparatus for performing the method and the uses of the apparatus, and a rubber mixture and also a pneumatic vehicle tyre or a technical rubber article comprising a component composed of the rubber mixture.

20 Claims, No Drawings

(56)     References Cited

OTHER PUBLICATIONS

Finazzi, E., Gallo, A., Lucci, P., / Continuous compounding and recycling using a co-rotating twin screw extruder, Rubber World / Dec. 1, 2016.

Joseph, A.M., Georg, B., Madhusoodanan, K.N., Alex, R / The current status of Sulphur vulcanization and devulcanization chemistry / Apr. 1, 2016, Rubber Science, 29(1):62-100, 2016.

International Search Report and Written Opinion dated Aug. 19, 2021 of International Application PCT/DE2021/200073 on which this application is based.

EP Examination Report dated Jan. 8, 2026 of counterpart European Application No. 21731920.1.

Chinese Office Action dated Nov. 24, 2023 corresponding to Chinese Patent Application No. 202180040429.1.

Third Party Observation dated Mar. 20, 2025 of counterpart EP application No. 21731920.1 (published EP4161988A1).

Chinese Second Office Action dated Jun. 6, 2024 for the counterpart Chinese Patent Application No. 202180040429.1 and machine translation of same.

* cited by examiner

METHOD FOR THE DEVULCANISATION OF A VULCANISAED RUBBER MIXTURE, DEVICE FOR CARRYING OUT THE METHOD, AS WELL AS A RUBBER MIXTURE AND VEHICLE PNEUMATIC TYRE, COMPRISING A COMPONENT MADE OF THE RUBBER MIXTURE

The invention relates to a process for devulcanization of a vulcanized rubber mixture. The invention also comprises an apparatus for performing the method and the uses of the apparatus, and a rubber mixture and also a pneumatic vehicle tyre or a technical rubber article comprising a component composed of the rubber mixture.

As in most industries, the rubber industry too is obliged to use a minimum amount of material made from new raw materials, especially fossil raw materials, in the production of industrial rubber articles, and in particular to reuse post-consumer materials.

One of the existing approaches for reuse of post-consumer rubber is devulcanization of the already vulcanized post-consumer rubber. In such a devulcanization, the crosslinking between the rubber polymers in the rubber, which usually consists of sulfur-sulfur bonds, is split in order subsequently to recrosslink the "decrosslinked" rubber polymers in a vulcanization step and hence to obtain, with addition of further mixture constituents, a rubber mixture having at least the same properties as a freshly produced rubber mixture made from new fossil or renewable raw materials.

The prior art discloses various processes for devulcanization:

CN 105729755 discloses a multistage process for producing injection moulds from screw rubber, comprising the following steps: adding rubber powder to a feeding machine and controlling the feed volume of the feed to the twin screw in the first stage, heating the screw and the extruder barrel, and extruding the rubber powder with a hot barrel and a hot screw (cf. claim 1).

CN 102250381 B discloses a twin-screw desulfurization system for rubber, consisting of: a cylinder body, a twin screw and a heating apparatus in the cylinder body, the cylinder body having a feed port, the twin screw having a conveying section and having two or more mutually separated shear regions, and a transition section and a mixing section between two adjacent shear regions (cf. claim 1).

US 2015148435 discloses a process for devulcanizing a vulcanized rubber, comprising the following steps:
  a) providing at least one vulcanized rubber;
  b) comminuting the vulcanized rubber into aggregates;
  c) kneading the ground rubber obtained from step b) at a low shear rate between 100 1/s and 500 1/s, such that it is homogenized in terms of the size of the aggregates and of temperature;
  d) achieving non-degrading mechanical treatment on the kneaded rubber obtained from step c), employing a high shear rate between 1000 1/s and 1 000 000 1/s (cf. claim 1).

EP 1201390 discloses a process for devulcanizing crosslinked rubber, consisting of a reclaiming stage from crosslinked rubber, by applying shear stress to the crosslinked rubber, where the maximum pressure in the reclaiming stage is 1.5 MPa or more (cf. claim 1).

The prior art, including inter alia the documents described above, exhibits the problem that it is not only the sulfursulfur bonds between the rubber polymers that are broken but also the C—C bonds of the polymer chains, thus leading to a shortening of the average chain length of the rubber polymers. This has resulted in poorer quality, in particular a lower breaking elongation, of the tires resulting from these rubber mixtures and should therefore be avoided.

Furthermore, document WO 2014/032818 A1, describes that the rubber mixture produced according to the process disclosed in WO 2014/032818 A1 exhibit faster aging of the vulcanizates produced from the rubber mixtures compared to reference and comparative measurements (cf. breaking elongation values before and after aging in table 2 of WO 2014/032818 A1). There is therefore a need in the prior art to provide longer-lasting and/or more resilient rubber articles with rubber mixtures comprising the vulcanized rubber.

A problem addressed by the invention consists in providing a process for devulcanization of a vulcanized rubber mixture, by means of which process a devulcanized rubber can be produced, from which a rubber mixture with improved properties and/or without the disadvantages known from the prior art is formed.

This object is achieved according to the invention by a process for devulcanization of a vulcanized rubber mixture comprising the steps of
  A) providing or producing a vulcanized rubber mixture,
  B) comminuting the vulcanized rubber mixture into a granulate of vulcanized rubber particles or comminuting the vulcanized rubber particles into vulcanized rubber particles,
  C) extruding the vulcanized rubber particles produced in step B) in a twin-screw extruder to form a devulcanized rubber mixture,
  wherein during the extruding in step C) at least one regeneration reagent is added to the extruded rubber particles, wherein the one regeneration reagent comprises at least one silane, at least one plasticizer, at least one aging stabilizer or mixtures thereof.

It is an exceptional achievement of the present invention to have found that the use of an above-described regeneration reagent during the vulcanization in a twin-screw extruder forms a devulcanized rubber mixture which when used in the production of a new rubber mixture prolongs the lifetime of tires or of technical rubber articles comprising the devulcanized rubber mixture according to the invention relative to rubber mixtures comprising rubber devulcanized by other means. In addition, the processability of the new rubber mixture thus formed was simultaneously improved as is apparent from a lower Mooney viscosity of the resulting rubber mixture and an improved breaking elongation of the vulcanizate formed from the resulting rubber mixture. Without wishing to be bound to a particular scientific theory it is thought that the above-described regeneration reagent prevents a shortening of the polymer chains of the rubber and/or simultaneously alters the sulfur bridges of the vulcanized rubber particles such that they are ideally reusable in a subsequent further vulcanization. The latter point in particular results in a longer lifetime in a tire or a technical rubber article comprising a rubber mixture in which a devulcanized rubber according to the invention is used.

Preference is given to a process as described above or as described as preferable above, wherein the one regeneration reagent consists at least of a silane, at least of a plasticizer, at least of an aging stabilizer or of mixtures thereof.

In the context of the present invention, the term "devulcanized" is to be understood as meaning that the process, i.e. devulcanized, rubber mixture has fewer sulfur-sulfur bonds than the unprocessed, i.e. non-devulcanized, rubber mixture.

Preference is given to a process as described above or as described as preferable above, wherein the regeneration reagent comprises at least one plasticizer and at least one silane.

Preference is given to a process as described above or as described as preferable above, wherein the regeneration reagent comprises at least one aging stabilizer and at least one silane, comprises an aging stabilizer and at least one plasticizer, comprises an aging stabilizer and at least one plasticizer and at least one silane, or comprises a resin, an aging stabilizer, at least one plasticizer and at least one silane, wherein the aging stabilizer is preferably selected from the group consisting of 2,6-di-tert-butyl-4-methylphenol (BHT), 2,2'-methylene-bis(4-methyl-6-tert-butyl-phenol), 2,2'-methylene-bis(4-methyl-6-cyclohexyl-phenol), 2-mercaptobenzimidazole, N-(1,3-dimethylbutyl)-N'-phenyl-p-phenylenediamine (6PPD) and methyl-2-mercaptobenzimidazole.

One advantage of the above-described aspect of the present invention is that the aging stabilizer improves the processability of a mixture comprising the devulcanized rubber mixture according to the invention.

The examples which follow employ the particularly preferred aging stabilizer 6PPD as an example of the aging stabilizers described as preferred hereinabove and this stabilizer surprisingly reduces the Mooney viscosity of the rubber mixture devulcanized according to the invention without seriously affecting breaking elongation or the results of the fatigue-to-failure test. The aging stabilizer 6PPD it is also referred to as "N-(1,3-dimethylbutyl)-N'-phenyl-p-phenylendiamine".

Preference is given to a process as described above or as described as preferable above, wherein the regeneration reagent comprises one or more plasticizers or consists of one or more plasticizers, wherein the one plasticizer or one of the two or more plasticizers or each of the two or more plasticizers are particularly preferably an oil having a content of polycyclic aromatics of more than 0.1% by weight, very particularly preferably polycyclic aromatics of in the range from 1% to 70% by weight, especially particularly preferably polycyclic aromatics of in the range from 10% to 40% by weight, in each case as determined by the IP346 method, and/or selected from mild extraction solvents (MES), treated aromatic extracts of treated distillate (TDAE) and heavy naphthenic oils, wherein the regeneration reagent very particularly preferably contains no aging stabilizer and no aging stabilizer is added to the extruded rubber particles during the extruding in step C).

One advantage of the above-described aspect of the present invention is that a high proportion of aromatics in the plasticizer prevents a shortening of the polymer chains during devulcanization of the vulcanized rubber particles and/or reduces the temperature in step C) of a process according to the invention. This still further improves the processability and/or lifetime of a tire or a technical rubber article comprising the devulcanized rubber mixture according to the invention.

Plasticizers that are very particularly advantageous for the present invention are described in paragraphs [0007] to [0015] of the document EP 1493596 B1.

Preference is given to a process as described above or as described as preferable above, wherein the one regeneration reagent added during step C)

is added in an amount in the range from 20% to 0.1% by weight, preferably in an amount in the range from 10% to 1% by weight, particularly preferably in an amount in the range from 6% to 3% by weight, in each case based on the sum of the mass of vulcanized rubber particles extruded in step C) and the mass of regeneration reagent added in step C), and/or the regeneration reagent comprises at least one silane and/or the total amount of silanes, which preferably comprise at least one disulfide or consist of one or more disulfides, in an amount in the range of less than 5% by weight, particularly preferably in an amount in the range of less than 1% by weight, very particularly preferably in an amount in the range of less than 0.1% by weight, especially particularly preferably comprises no silane whatsoever, in each case based on the sum of the mass of vulcanized rubber particles extruded in step C) and the mass of regeneration reagent added in step C).

It is an advantage of the above-described aspect of the present invention when the employed silane in the regeneration reagent is from the class of disulfides. These are particularly suitable for a process according to the invention, for example compared to tetrasulfides. In a process according to the invention it is particularly advantageous to employ regeneration reagents comprising silanes, wherein the silanes comprise a total amount in the regeneration reagent of 40% to 100% by weight of disulfides, particularly preferably 55% to 85% by weight of disulfides and very particularly preferably 60% to 80% by weight of disulfides. Such a mixture is obtainable for example from Evonik under the trade name Si 266® which is described in DE 102006004062 A1 for example.

Preference is given to a process as described above or as described as preferable above, wherein during the extruding during the entirety of step C)

a specific energy input of 0.01 to 5 kWh/kg is introduced into the vulcanized rubber particles based on the total mass of the vulcanized rubber particles extruded in step C), preferably 0.1 to 1 kWh/kg, and/or the temperature of the vulcanized rubber particles is in the range from 50° C. to 200° C., preferably in the range from 75° C. to 180° C., particularly preferably in the range from 110° C. to 150° C.

One advantage of the above-described aspect of the present invention is that observing the above-described upper limits results in an even longer lifetime of a tire or a technical rubber article comprising the devulcanized rubber mixture according to the invention. The regeneration reagent additionally imparts a surprisingly good effect in this temperature range. It is thought that the regeneration reagent is distributed, and thus captures radicals, particularly well in this temperature range.

Preference is given to a process as described above or as described as preferable above, wherein in a step D) carried out subsequently to step C) the devulcanized rubber mixture is held at a temperature of 50° C. to 150° C., preferably of 100° C. to 150° C., and/or is pressed through a filter unit comprising a sieve and/or a perforated plate, wherein the devulcanized rubber mixture is preferably heated to a temperature of 50° C.

to 150° C., preferably of 100° C. to 150° C., on account of the pressing through the filter unit.

One advantage of the above-described aspect of the present invention is that observing the above-described upper limits results in an even longer lifetime of a tire or a technical rubber article comprising the devulcanized rubber mixture according to the invention.

A further advantage of the above-described aspect of the present invention is that an above-described filter unit comprising a sieve and/or a perforated plate may be employed directly downstream of the twin-screw extruder or directly downstream of the further kneading unit and a rubber mixture filtered through this filter unit thus exhibits even better processability.

Preference is given to a process as described above or as described as preferable above, wherein during the extruding in step C) the screw speed of the screws of the twin-screw extruder is at least primarily in the range from 10 to 500 revolutions per minute, preferably in the range from 100 to 300 revolutions per minute.

One advantage of the above-described aspect of the present invention is that observing the above-described upper limits results in an even longer lifetime of a tire or a technical rubber article comprising the devulcanized rubber mixture according to the invention. The regeneration reagent additionally imparts a surprisingly good effect in this speed range. It is thought that the regeneration reagent is distributed, and thus captures radicals, particularly well in this speed range.

Preference is given to a process as described above or as described as preferable above, wherein during the extruding in the entire step C)

the vulcanized rubber particles produced in step B) are extruded in the twin screw extruder at a shear rate of below 300 s$^{-1}$, preferably at a shear rate in the range from 1 s$^{-1}$ to 100 s$^{-1}$, preferably in the range from 10 s$^{-1}$ to 80 s$^{-1}$, wherein the shear rates are particularly preferably measured only at the screw elements which are conveying elements, and/or the temperature of the vulcanized rubber particles is below 200° C. and a devulcanized rubber mixture having a temperature of above 100° C. is formed, wherein the twin-screw extruder preferably has a length of less than 60 D.

One advantage of the above-described aspect of the present invention is that observing the above-described upper limits results in an even longer lifetime of a tire or a technical rubber article comprising the devulcanized rubber mixture according to the invention. The regeneration reagent additionally imparts a surprisingly good effect in this temperature range. It is thought that the regeneration reagent is distributed, and thus captures radicals, particularly well in this temperature range.

In the context of the present invention, the expression "in an extruder with a shear rate in the range from X to Y" means that the shear rate is in the range from X to Y over all screw segments of the extruder. In the context of the present invention, the shear rate of a screw segment of an extruder is calculated by means of the following formula:

$$\text{shear rate}=v/h \qquad \text{(Formula 1)},$$

where:

v=2π×(speed of rotation of the screw [1/s])×(distance between the axis of rotation of the screw and the radially outermost point of the screw element in question [mm]);

h=distance in a cross section at right angles to the axis of rotation of the screw between the inner face of the extrusion barrel and the outer surface of the screw core [mm].

Preference is given to a process as described above or as described is preferable above, wherein the vulcanized rubber particles resulting in step B) have a maximum particle diameter of 100 mm and/or the proportion of the comminuted rubber particles resulting in step B) that passes through a 44 mesh sieve in a sieve test according to Japanese industrial standard JIS P-8207 is at least 50% by weight of the total mass of comminuted rubber particles resulting in step B), preferably at least 80% by weight of the total mass of comminuted rubber particles resulting in step B).

One advantage of the above-described aspect of the present invention is that the resulting rubber particles result in a particularly long lifetime of a tire or a technical rubber article comprising the devulcanized rubber mixture according to the invention and/or improved processability of the devulcanized rubber mixture according to the invention. This especially does not apply when the vulcanized rubber particles resulting in step B) have a maximum particle diameter of above 100 mm.

Preference is given to a process as described above or as described as preferable above, wherein the average particle diameter of the rubber particles resulting in step B) is in the range from 0.01 mm to 50 mm, preferably in the range from 0.1 mm to 20 mm.

One advantage of the above-described aspect of the present invention is that the resulting rubber particles result in a particularly long lifetime of a tire or a technical rubber article comprising the devulcanized rubber mixture according to the invention and/or improved processability of the devulcanized rubber mixture according to the invention.

Particular preference is given to a process as described above comprising the steps of:

A) providing or producing a vulcanized rubber mixture,

B) comminuting the vulcanized rubber mixture into a granulate of vulcanized rubber particles, C) extruding the vulcanized rubber particles produced in step B) in a twin-screw extruder comprising an extruder barrel having a length of less than 60 D to form a devulcanized rubber mixture, wherein during the extruding in step C) at least one regeneration reagent is added to the extruded rubber particles, wherein the regeneration reagent comprises at least one plasticizer, wherein each of at the least one plasticizers is an oil having a content of polycyclic aromatics in the range from 10% to 40% by weight, as determined by the IP346 method, and selected from mild extraction solvents (MES), treated aromatic extracts of treated distillate (TDAE) and heavy naphthenic oils, the one regeneration reagent added during step C)

is added in an amount in the range from 10% to 0.1% by weight based on the sum of the mass of vulcanized rubber particles extruded in step C) and the mass of regeneration reagent added in step C) and comprises no silane and the temperature of the vulcanized rubber particles dur-
ing the extruding in step C) is in the range from 100°
C. to 200° C., in a step E) carried out subsequently to step D) the
devulcanized rubber mixture is heated to a temperature
of 50° C. to 150° C., during the extruding in step C) the screw speed of the
screws of the twin-screw extruder is at least primarily
in the range from 100 to 300 rpm, the vulcanized rubber
particles produced in step B) are produced in the
twin-screw extruder at a shear rate of below 300 s$^{-1}$,
the vulcanized rubber particles resulting in step B) have a
maximum particle diameter of 100 mm
and
the average particle diameter of the rubber particles
resulting in step B) is in the range from 0.01 mm to 50
mm.

The above-described advantageous aspects of a process of
the invention for devulcanizing a vulcanized rubber mixture
are also applicable to all aspects of an apparatus described
hereinafter, and the advantageous aspects of apparatuses of
the invention that are discussed hereinafter are also appli-
cable to all aspects of a process of the invention for
devulcanizing a vulcanized rubber mixture.

The invention also relates to an apparatus for performing
a process according to any of the preceding claims com-
prising a twin-screw extruder, preferably having a length of
less than 60 D.

Preference is given to an apparatus as described above or
as described is preferable above, wherein the one twin-screw
extruder comprises a feed unit for feeding a regeneration
reagent as described above or as described as preferable
above, wherein the feed unit is adapted for introducing the
regeneration reagent at a point on the upper half of the inner
wall of the extruder barrel of the one twin-screw extruder
viewed in a horizontal cross section, wherein the upper half
of the inner wall of the extruder barrel viewed in a horizontal
cross section perpendicular to the extrusion direction is
particularly preferably the half of the inner wall of the
extruder barrier that is further removed from the ground in
the case of a horizontally oriented extruder barrel for
example.

One advantage of the above-described aspect of the
present invention is that the pressure variations in the rubber
mixture in said twin-screw extruder are reduced and accord-
ingly the devulcanized rubber mixture according to the
invention exhibits the desired breaking elongation and the
vulcanizate resulting therefrom exhibits the desired lifetime.

Preference is given to an apparatus as described above or
as described as preferred above, wherein the apparatus
additionally comprises:

a further kneading unit arranged downstream of the
twin-screw extruder which preferably comprises a
single-screw extruder and/or a gear pump and/or a
mixer for producing rubber mixtures, and/or a filter unit comprising a sieve and/or a perforated plate,
and/or a particle comminution unit for comminuting a vulcanized
rubber mixture into a granulate of vulcanized rubber
particles having a maximum particle diameter of 100
mm and/or having an average particle diameter in the
range from 0.1 mm to 20 mm.

One advantage of the above-described aspect of the
present invention is that an above-described filter unit com-
prising a sieve and/or a perforated plate may be employed
directly downstream of the twin-screw extruder or directly downstream of the further kneading unit and a rubber
mixture filtered through this filter unit thus exhibits even
better processability compared to apparatuses without the
filter unit. This is apparent in particular from the improved
Mooney viscosity or the improved breaking elongation after
vulcanization of the filtered rubber mixture.

Particular preference is given to an apparatus as described
above or as described as preferable above, wherein the
apparatus comprises a mixer arranged downstream of the
one twin-screw extruder for producing the rubber mixture
comprising the extrudate from the one twin-screw extruder
and a forming unit arranged downstream of the one mixer
for forming an unvulcanized tire body component, wherein
the forming unit is preferably adapted for forming and
cutting to size a rubber mixture produced with the mixer
comprising a rubber mixture devulcanized using the twin-
screw extruder to afford an unvulcanized tire component and
the unvulcanized tire components is particularly preferably
and unvulcanized tire body component.

In the context of the present invention the expression
"unit A is arranged downstream of unit B", is to be under-
stood as meaning that unit A is adapted for accommodating
and further processing a rubber mixture processed in unit B
without intermediate storage and without further processing
between the units A and B.

Particular preference is given to an apparatus as described
above comprising:

a twin-screw extruder comprising a horizontally oriented
extruder barrel having a length of less than 60 D,
wherein the one twin-screw extruder comprises a feed
unit for feeding a regeneration reagent as described
above, wherein the feed unit is adapted for feeding the
regeneration reagent at a point on the upper half of the
inner wall of the extruder barrel of the one twin-screw
extruder viewed in a horizontal cross section perpen-
dicular to the extrusion direction, a mixer arranged downstream of the twin-screw extruder
for producing a rubber mixture comprising the extru-
date from the one twin-screw extruder, a forming unit arranged downstream of the mixer for
forming an unvulcanized tire components and a particle comminution unit arranged upstream of the
twin-screw extruder
for comminuting a vulcanized rubber mixture into a
granulate of vulcanized rubber particles having a
maximum particle diameter of 100 mm and having
an average particle diameter in the range from 0.1
mm to 20 mm
and
for feeding vulcanized rubber particles comminuted
using the particle comminution unit into the one
twin-screw extruder.

The above-described advantageous aspects of an appara-
tus according to the invention for performing a process
according to the invention and a process according to the
invention for devulcanization of a vulcanized rubber mixture
are also applicable to all aspects of a use described below
and the advantageous aspects of uses according to the
invention discussed below are correspondingly applicable to
all aspects of an apparatus according to the invention for
performing a process according to the invention and to a
process according to the invention for devulcanization of a
vulcanized rubber mixture.

The invention further relates to a use of an apparatus as described above or as described as preferable above
- for devulcanization of a vulcanized rubber mixture and/or
- for producing an unvulcanized rubber mixture comprising a devulcanized rubber mixture as described above or as described as preferable above.

The production of an unvulcanized rubber mixture comprising a devulcanized rubber mixture as described above or as described as preferable above is preferably carried out with an apparatus according to the invention as described above or as described as preferable above or as described as particularly preferable above, wherein during the mixing in the one mixer described above further rubbers and other rubber mixture constituents are added.

The invention also relates to a use
- of a rubber mixture devulcanized by a process as described above or as described as preferable above or
- of a rubber mixture produced by the use as claimed in the preceding claim for producing a tire component or a technical rubber article, preferably for producing a vulcanized tire body component of a pneumatic vehicle tire or of a vulcanized technical rubber article, wherein the vulcanized tire body component of a pneumatic vehicle tire is particularly preferably produced by vulcanization of an unvulcanized tire body component or the vulcanized technical rubber article is produced by vulcanization of a vulcanized technical rubber article.

The processability of the rubber mixture is particularly important in the production of the tire body components since tire body components are particularly delicate and thus tear easily. This applies correspondingly to mixtures for side strips or apex mixtures and also to wing components of treads and the base mixture of treads. The present invention is thus particularly advantageous for such tire components.

In the context of the present invention the vulcanization is carried out in a vulcanization mold known to those skilled in the art and the known temperature ranges between 100° C. and 200° C.

Preference is given to a use as described above or as described as preferable above, wherein the vulcanized tire component or the vulcanized produced technical rubber article, preferably the produced unvulcanized or produced vulcanized tire body component of a pneumatic vehicle tire,
- has at least in one spatial direction a maximum extent of 100 mm, preferably in one spatial direction a maximum extent of 10 mm, and/or
- a breaking elongation at room temperature according to DIN 53504 in the range from 4535% to 490%, preferably in the range from 468% to 480%, and/or
- in the "fatigue-to-failure" test according to ASTM D4482 at 106% elongation and room temperature achieves values in the range of above 205 150 kC, preferably values in the range of above 300 kC, particularly preferably values in the range of above 500 kC, very particularly preferably values in the range of above 1000 kC, especially particularly preferably values in the range of above 1500 kC or from 1500 kC to 2000 kC.

One advantage of the above-described aspect of the present invention is that the above-described values can only be achieved with a rubber mixture which comprises a rubber devulcanized according to the invention. The values described as preferred above may in particular be achieved with a regeneration reagent composed exclusively of a resin.

A rubber mixture produced as described in the above uses passes through the following process according to the invention for producing a vulcanized tire or a vulcanized technical rubber article comprising the steps of:
- A) providing or producing a vulcanized rubber mixture,
- B) comminuting the vulcanized rubber mixture into a granulate of vulcanized rubber particles,
- C) extruding the vulcanized rubber particles produced in step B) in a twin-screw extruder, preferably in a twin-screw extruder according to an above-described apparatus according to the invention to form a devulcanized rubber mixture,
- D) feeding the devulcanized rubber mixture formed in step C) into a mixer, preferably into a mixture according to an above-described apparatus according to the invention,
- E) mixing the devulcanized rubber mixture in the mixer with further rubber mixture constituents to form an unvulcanized rubber mixture,
- F) forming and cutting to size the unvulcanized rubber mixture formed in step
- E) in a forming unit, preferably in a forming unit according to an above-described apparatus according to the invention to form an unvulcanized tire component or an unvulcanized technical rubber article,
- G) vulcanizing the unvulcanized tire component formed in step F) or an unvulcanized technical rubber article formed in step F) in a vulcanization mold optionally with further unvulcanized tire components to form a vulcanized tire or a vulcanized technical rubber article, wherein
- during the extruding in step C) at least one regeneration reagent is added to the extruded rubber particles, wherein the one regeneration reagent comprises at least one silane, at least one plasticizer, at least one aging stabilizer or mixtures thereof and is preferably configured as described above in a process according to the invention described as preferable or as described above in a process according to the invention described as particularly preferable and/or
- the rubber mixture constituents comprise at least one rubber, for example NR, BR, SBR, and a filler, for example silica or carbon black, wherein the total amount of rubber is preferably 200% by weight to 500% by weight and/or the total amount of filler is preferably 100% by weight to 250% by weight, in each case based on the total amount of devulcanized rubber mixture supplied in step C).

The above-described advantageous aspects of an apparatus according to the invention for performing a process according to the invention and a process according to the invention for devulcanization of a vulcanized rubber mixture and also any of the uses according to the invention are also applicable to all aspects of a rubber mixture, pneumatic vehicle tire or technical rubber article described below and the advantageous aspects of rubber mixtures, pneumatic vehicle tires or technical rubber articles according to the invention discussed below are correspondingly applicable to all aspects of an apparatus according to the invention for performing a process according to the invention and to a process according to the invention, a process according to the invention for devulcanization of a vulcanized rubber mixture and to any of the uses according to the invention.

The invention further relates to a rubber mixture produced or producible

> by a process as described above or as described as preferred above,
>
> or
>
> according to the use as described above or as described as preferred above for producing a technical rubber article, preferably for producing a vulcanized tire body component of a pneumatic vehicle tire, wherein the vulcanized tire body component of a pneumatic vehicle tire is particularly preferably produced by vulcanization of an unvulcanized tire body component.

The invention further relates to a pneumatic vehicle tire or technical rubber article comprising a component consisting of a rubber mixture as described above or as described as preferable above, wherein the component > has at least in one spatial direction a maximum extent of 100 mm, preferably in one spatial direction a maximum extent of 10 mm, and/or > a breaking elongation at room temperature according to DIN 53504 in the range from 453% to 490%, preferably in the range from 468% to 480%,
>
> and/or
>
> in the "fatigue-to-failure" test according to ASTM D4482 at 106% elongation and room temperature achieves values in the range of above 205 kC, preferably values in the range of above 300 kC or from 300 kC to 5000 kC, particularly preferably values in the range of above 500 kC or from 500 kC to 4000 kC, very particularly preferably values in the range of above 1000 kC or from 1000 kC to 2500 kC, especially particularly preferably values in the range of above 1500 kC or from 1500 kC to 2000 kC. The pneumatic vehicle tire may also very generally be a vehicle tire and the component composed of a rubber mixture as described above or as described as preferred above may also be the component of a vehicle tire.

As described above, vehicle tires and vulcanized rubber mixtures in general may be produced with new materials or with reused raw materials, i.e. a new rubber or devulcanized rubber. After incorporation of a devulcanized rubber into a rubber mixture said rubber may subsequently be identified for example in a component of a vehicle tire or generally in a vulcanized rubber mixture and it is irrelevant how the devulcanized rubber was produced. Identification of the rubber may be carried out with commercially available SEM microscopes with EDX functionality (these abbreviations stand for "scanning electron microscopy (SEM) with energy dispersive x-ray analysis (EDX)"). Sufficient magnification in the submillimeter range should be used. The EDX functionality can be used to distinguish devulcanized rubber from other primary and secondary particles or agglomerates, for example filler particles, and it is therefore possible to distinguish between vulcanized rubber mixtures with devulcanized rubber and vulcanized rubber mixtures without a devulcanized rubber. The same applies to vulcanized rubber mixtures in vehicle tire components. However, only vulcanized vehicle tire components comprising a rubber devulcanized according to the invention can achieve > the breaking elongations as described above for a vulcanized rubber mixture or a vehicle tire
>
> and/or
>
> the "fatigue to failure" values as described above for a vulcanized rubber mixture or a vehicle tire in the ranges specified or specified as preferable. A person skilled in the art can therefore distinguish vehicle tires according to the invention, in particular pneumatic vehicle tires according to the invention, from noninventive vehicle tires, in particular noninventive pneumatic vehicle tires.

EXPERIMENTAL EXAMPLES

Test Methods:

1. Mooney Viscosity

> The results were determined at 100° C. (in Mooney units M.U.) on the basis of the method of DIN 53523 (ML1+3).

2. Breaking Elongation

> The results were determined at room temperature on the basis of the method of DIN 53504 [units: %].

3. Fatigue-to-Failure Test ("Monsanto Fatigue Test")

> The results were determined at 106% elongation and room temperature on the basis of the method of ASTM D4482. The results were reported in units of kilocycles (kC for short).

Production of the Devulcanizates V1, E1 and E2:

Initially, old truck tires were comminuted in a particle comminution unit to afford a granulate of vulcanized rubber particles having a maximum particle diameter of 100 mm and having an average particle diameter in the range from 0.1 mm to 20 mm.

Production of the devulcanizates according to the invention from this granulate was carried out in a twin-screw extruder comprising an extruder barrel having a horizontally oriented extruder barrel having a length of less than 60 D, wherein the one twin-screw extruder comprised a feed unit for feeding a regeneration reagent and the regeneration reagent was at a point above the extruder barrel introduced vertically downwards into the extruder barrel of the one twin-screw extruder. The process for devulcanization of the produced vulcanized rubber particles comprised the following step C):

> C) extruding the produced vulcanized rubber particles in a twin-screw extruder comprising an extruder barrel having a length of less than 60 D, wherein during the extruding in step C) an amount of regeneration reagent according to table 1 is added to the extruded rubber particles, wherein the regeneration reagent comprises > a plasticizer and no silane (devulcanizate E1)
>
> or
>
> a plasticizer with aging stabilizer but no silane (devulcanizate E2), wherein > during the extruding in step C) the screw speed of the screws of the twin-screw extruder is 200 rpm and during the extruding in step C) the vulcanized rubber particles are extruded in the twin-screw extruder at a shear rate of below 300 s$^{-1}$,
>
> during step C) the temperature of the vulcanized rubber particles is in the range from 140° C. to 160° C. and
>
> in a temperature control step D) carried out subsequently to step C) the devulcanized rubber mixture is heated to a temperature of 50° C. to 150° C. for 10 minutes.

For the comparative vulcanizate V1 no regeneration reagent was added during the extruding. The production parameters otherwise remained the same.

TABLE 1

| Constituents | Unit | V1 (comp.) | E1 (inv.) | E2 (inv.) |
|---|---|---|---|---|
| vulcanized rubber particles | % by wt. | 100 | 92.5 | 94.5 |
| TDAE | % by wt. | — | 5.5 | 5.5 |
| Aging stabilizer 6PPD* | % by wt. | — | 2 | — |

*6PPD: N-(1,3-dimethylbutyl)-N'-phenyl-p-phenylenediamine (CAS No.: 793-24-8)

Production of the exemplary mixtures VB1, EB1 and EB2:

The inventive and noninventive devulcanizates were each mixed in a mixer with further constituents according to the following table 2 to obtain the inventive and noninventive rubber mixtures VB1, EB1 and EB2. The resulting rubber mixtures VB1, EB1 and EB2 were then cut into a cut-to-size unvulcanized test component in a forming unit and subsequently vulcanized to afford a test component. The forming unit comprised an extruder with a preliminary and final template for forming an unvulcanized component and a downstream cutting unit for cutting the unvulcanized component into the intended shape for testing the breaking elongation or the "fatigue-to-failure" values.

TABLE 2

| Constituents: | Unit | Mixing stage | VB1 Non-inv. | EB1 Inv. | EB2 Inv. |
|---|---|---|---|---|---|
| NR | phr | 1 | 25 | 25 | 25 |
| BR | phr | 1 | 50 | 50 | 50 |
| SBR | phr | 1 | 25 | 25 | 25 |
| Devulcanizate V1 | phr | 1 | 28 | — | — |
| Devulcanizate E1 | phr | 1 | — | 28 | — |
| Devulcanizate E2 | phr | 1 | — | — | 28 |
| Carbon black | phr | 1 | 40 | 40 | 40 |
| Plasticizer | phr | 1 | 5 | 5 | 5 |
| Aging inhibitor | phr | 1 | 2 | 2 | 2 |
| Stearic acid | phr | 1 | 2 | 2 | 2 |
| ZnO | phr | 1 | 3 | 3 | 3 |
| Sulfur | phr | 2 | 1.5 | 1.5 | 1.5 |
| Vulcanizing agent | phr | 2 | 1.5 | 1.5 | 1.5 |

| | Unit | VB1 | EB1 | EB2 |
|---|---|---|---|---|
| Chemical properties of the mixtures before vulcanization | | | | |
| Mooney viscosity | M.U. | 55 | 49 | 51 |
| Physical properties of the mixtures before vulcanization | | | | |
| Breaking elongation | % | 449 | 456 | 469 |
| Fatigue-to-failure test | kC | 66.9 | >2000 | >2000 |

As is apparent from table 2 the vulcanizates of the rubber mixtures EBI and EB2 which contain the inventive devulcanizates E1 and E2 exhibit much higher and thus much better values in the fatigue-to-failure test than rubber mixtures such as VB1 which contain the devulcanizate V1 known from the prior art. No cracks which would have lead to test termination were determined even after 2 million cycles (i.e. >2000 kC). This is an unexpected technical effect. This is unexpected especially because the values in the measurement of breaking elongation differ from one another only minimally.

The rubber mixtures BE1 and BE2 exhibit a comparatively higher Mooney viscosity relative to the mixture VB1. The Mooney viscosity generally shows that the rubber mixtures are more readily processable and that process reliability increases for the inventive mixtures.

The invention claimed is:

1. A method for devulcanization of a vulcanized rubber mixture, the method comprising:
   A) producing a vulcanized rubber mixture;
   B) processing the vulcanized rubber mixture into a granulate of vulcanized rubber particles;
   C) extruding the vulcanized rubber particles produced in B) in a twin-screw extruder to form a devulcanized rubber mixture;
   wherein during the extruding:
      at least one regeneration reagent is added to the rubber particles in the extruder, wherein the at least one regeneration reagent comprises at least one of at least one silane, at least one plasticizer, at least one aging stabilizer, or mixtures thereof;
      the vulcanized rubber particles produced in step B) are extruded in the twin screw extruder at a shear rate of below 300 s$^{-1}$, and
      the temperature of the vulcanized rubber particles is below 200° C. and the devulcanized rubber mixture is formed at a temperature of above 100° C.;
   wherein the twin-screw extruder has a length of less than 60 D.

2. The method of claim 1, wherein the at least one regeneration reagent
   comprises the at least one plasticizer and the at least one silane, or
   comprises the at least one aging stabilizer and the at least one plasticizer, or
   comprises the at least one aging stabilizer and the at least one plasticizer and the at least one silane,
   wherein, the at least one plasticizer includes an oil having a content of polycyclic aromatics in the range from 1% to 70% by weight, as determined by the IP346 method.

3. The method of claim 1, wherein the at least one regeneration reagent added during step C)
   is added in an amount in the range from 20% to 0.1% by weight, in each case based on the sum of the mass of vulcanized rubber particles extruded in step C) and the mass of regeneration reagent added in step C).

4. The method of claim 1, wherein adding at least one regeneration reagent during the extruding further includes introducing a specific energy input of 0.01 to 5 kWh/kg into the vulcanized rubber particles based on the total mass of the vulcanized rubber particles extruded in step C).

5. The method of claim 1, wherein the devulcanized rubber mixture produced by the extruding is pressed through a filter unit comprising a sieve and a perforated plate, wherein the devulcanized rubber mixture is at a temperature of 50° C. to 150° C. when pressing through the filter unit.

6. The method of claim 1,
   the vulcanized rubber particles produced in step B) are extruded in the twin screw extruder at a shear rate in the range from 1 s$^{-1}$ to 100 s$^{-1}$.

7. The method of claim 1, wherein
   the average particle diameter of the rubber particles resulting in step B) is in the range from 0.01 mm to 50 mm,
and/or
   the proportion of the processed rubber particles resulting in step B) that passes through a 44 mesh sieve in a sieve test according to Japanese industrial standard JIS P-8207 is at least 50% by weight of the total mass of processed rubber particles resulting in step B),
   wherein the vulcanized rubber particles resulting in step B) have a maximum particle diameter of 100 mm.

8. The method according to claim 1, wherein the at least one regeneration reagent includes at least one plasticizer.

9. The method according to claim 1, wherein none of the regeneration reagent added in step C) is silane.

10. The method according to claim 9, wherein the at least one regeneration reagent added in step C) is selected from the group consisting of at least one plasticizer;

wherein the at least one plasticizer includes an oil having a content of polycyclic aromatics of in the range from 10% to 40% by weight, as determined by the IP346 method, the oil selected from mild extraction solvents (MES), treated aromatic extracts of treated distillate (TDAE), and naphthenic oils.

11. The method according to claim 9, wherein the vulcanized rubber particles produced in step B) are extruded in the twin-screw extruder at a shear rate of below 300 s$^{-1}$, the vulcanized rubber particles resulting in step B) have a maximum particle diameter of 100 mm, and the average particle diameter of the rubber particles resulting in step B) is in the range from 0.01 mm to 50 mm, the regeneration reagent added during step C) is added in an amount in the range from 10% to 0.1% by weight based on the sum of the mass of vulcanized rubber particles extruded in step C) and the mass of regeneration reagent added in step C), the temperature of the vulcanized rubber particles during the extruding in step C) is in the range from 100° C. to 200° C.

12. The method according to claim 1, wherein the at least one regeneration reagent includes at least one plasticizer, and the at least one plasticizer includes an oil having a content of polycyclic aromatics of in the range from 10% to 40% by weight, as determined by the IP346 method, the oil selected from mild extraction solvents (MES), treated aromatic extracts of treated distillate (TDAE), and naphthenic oils.

13. The method according to claim 1, wherein the vulcanized rubber particles produced in step B) are extruded in the twin-screw extruder at a shear rate from 1 s$^{-1}$ to 100 s$^{-1}$, the vulcanized rubber particles resulting in step B) have a maximum particle diameter of 100 mm, and the average particle diameter of the rubber particles resulting in step B) is in the range from 0.01 mm to 50 mm, the at least one regeneration reagent added in step C) includes at least one plasticizer, the least one plasticizer including an oil having a content of polycyclic aromatics in the range from 10% to 40% by weight, as determined by the IP346 method, and selected from mild extraction solvents (MES), treated aromatic extracts of treated distillate (TDAE) and heavy naphthenic oils, the regeneration reagent added during step C) is added in an amount in the range from 10% to 0.1% by weight based on the sum of the mass of vulcanized rubber particles extruded in step C) and the mass of regeneration reagent added in step C), and wherein none of the regeneration reagent added in step C) is silane.

14. A method for devulcanization of a vulcanized rubber mixture, the method comprising:

A) producing a vulcanized rubber mixture;

B) processing the vulcanized rubber mixture into a granulate of vulcanized rubber particles;

C) extruding the vulcanized rubber particles produced in B) in a twin-screw extruder to form a devulcanized rubber mixture;

wherein during the extruding, at least one regeneration reagent is added to the rubber particles in the extruder, wherein the at least one regeneration reagent comprises at least one of at least one silane, at least one plasticizer, at least one aging stabilizer, or mixtures thereof;

wherein none of the regeneration reagent added in step C) is silane, wherein the at least one regeneration reagent includes at least one plasticizer, wherein each of the at least one plasticizer is an oil having a content of polycyclic aromatics of in the range from 10% to 40% by weight, as determined by the IP346 method, the oil selected from mild extraction solvents (MES), treated aromatic extracts of treated distillate (TDAE), and naphthenic oils.

15. The method according to claim 14, wherein the at least one regeneration reagent added during step C) is added in an amount in the range from 20% to 1% by weight, in each case based on the sum of the mass of vulcanized rubber particles extruded in step C) and the mass of regeneration reagent added in step C).

16. The method of claim 14, wherein adding at least one regeneration reagent to the extruded further includes introducing a specific energy input of 0.01 to 5 kWh/kg into the vulcanized rubber particles based on the total mass of the vulcanized rubber particles extruded in step C).

17. The method of claim 14, wherein during the extruding the vulcanized rubber particles produced in step B) are extruded in the twin screw extruder at a shear rate in the range from 1 s$^{-1}$ to 100 s$^{-1}$, measured at the screw elements, and the temperature of the vulcanized rubber particles is below 200° C. and a devulcanized rubber mixture having a temperature of above 100° C. is formed, wherein the twin-screw extruder has a length of less than 60 D.

18. The method of claim 14, wherein the average particle diameter of the rubber particles resulting in step B) is in the range from 0.1 mm to 20 mm, and/or the proportion of the processed rubber particles resulting in step B) that passes through a 44 mesh sieve in a sieve test according to Japanese industrial standard JIS P-8207 is at least 50% by weight of the total mass of processed rubber particles resulting in step B), wherein the vulcanized rubber particles resulting in step B) have a maximum particle diameter of 100 mm.

19. A method for devulcanization of a vulcanized rubber mixture, the method comprising:

A) producing a vulcanized rubber mixture;

B) processing the vulcanized rubber mixture into a granulate of vulcanized rubber particles;

C) extruding the vulcanized rubber particles produced in B) in a twin-screw extruder to form a devulcanized rubber mixture;

wherein during the extruding, at least one regeneration reagent is added to the rubber particles in the extruder;

wherein the at least one regeneration includes at least one plasticizer and at least one aging stabilizer;

wherein the at least one plasticizer includes an oil having a content of polycyclic aromatics of in the range from 10% to 40% by weight, as determined by the IP346 method, the oil selected from mild extraction solvents (MES), treated aromatic extracts of treated distillate (TDAE), and naphthenic oils; and wherein the at least one aging stabilizer is selected from the group consisting of 2,6-di-tert-butyl-4-methylphenol (BHT), 2,2'-methylene-bis(4-methyl-6-tert-butyl-phenol), 2,2'-methylene-bis(4-methyl-6-cyclohexyl-phenol), 2-mercaptobenzimidazole, N-(1,3-dimethylbutyl)-N'-phenyl-p-phenylenediamine (6PPD) and methyl-2-mercaptobenzimidazole.

20. The method according to claim 19, wherein the vulcanized rubber particles produced in step B) are extruded in the twin-screw extruder at a shear rate of below 300 s⁻¹, the vulcanized rubber particles resulting in step B) have a maximum particle diameter of 100 mm, and the average particle diameter of the rubber particles resulting in step B) is in the range from 0.01 mm to 50 mm, the regeneration reagent added during step C) is added in an amount in the range from 10% to 0.1% by weight based on the sum of the mass of vulcanized rubber particles extruded in step C) and the mass of regeneration reagent added in step C), wherein none of the regeneration reagent added in step C) is silane, the temperature of the vulcanized rubber particles during the extruding in step C) is in the range from 100° C. to 200° C.

* * * * *